(12) United States Patent
Suzuki

(10) Patent No.: US 6,267,022 B1
(45) Date of Patent: Jul. 31, 2001

(54) ARTICULATED ROBOT

(75) Inventor: Shiaki Suzuki, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/419,820

(22) Filed: Oct. 18, 1999

(30) Foreign Application Priority Data

Nov. 6, 1998 (JP) .................................................. 10-315887

(51) Int. Cl.[7] .............................. B25J 18/00; B25J 17/00
(52) U.S. Cl. ...................................... 74/490.01; 74/490.03; 74/490.05; 901/15; 901/23; 901/49
(58) Field of Search ........................... 74/490.01, 490.03, 74/490.05; 901/49, 50, 15, 23

(56) References Cited

U.S. PATENT DOCUMENTS

| | | | | |
|---|---|---|---|---|
| 4,668,146 | * | 5/1987 | Ageta ................................. | 901/49 X |
| 4,697,978 | * | 10/1987 | Tada et al. ........................... | 414/729 |
| 4,732,526 | * | 3/1988 | Nakashima et al. ................ | 901/49 X |
| 4,802,815 | * | 2/1989 | Funabashi et al. .................. | 414/680 |
| 4,972,731 | * | 11/1990 | Akutagawa et al. ............... | 74/490.03 |
| 4,984,745 | * | 1/1991 | Akeel et al. ........................ | 901/49 X |
| 5,440,916 | * | 8/1995 | Stone et al. ........................ | 901/49 X |
| 5,785,727 | * | 7/1998 | Mine et al. ........................ | 901/49 X |
| 6,039,068 | * | 3/2000 | Tessier et al. ..................... | 901/49 X |

FOREIGN PATENT DOCUMENTS

| | | | |
|---|---|---|---|
| 63-65973 | * | 3/1988 | (JP) . |
| 5-8194 | | 1/1993 | (JP) . |

* cited by examiner

*Primary Examiner*—Allan D. Herrmann
(74) *Attorney, Agent, or Firm*—Wenderoth, Lind & Ponack, L.L.P.

(57) ABSTRACT

In the invention, the structure of an articulated robot is a hollow structure, and the entire body of the arms and closing cover is formed as an enclosed structure. Therefore, an air flow communication passage is maintained, so that dust formed in the robot can be discharged outside of the clean room. Moreover, by forming two or more openings, the pressure level in the robot can be controlled, and without causing adverse effects on the speed reducer or bearing in the slide parts of the articulated robot, it is possible to prevent dust particles of the slide parts generated during operation of the arm, or volatile vapor of lubricant, from flowing out of the robot body.

7 Claims, 3 Drawing Sheets

ARTICULATED ROBOT

FIELD OF THE INVENTION

The present invention relates to an articulated robot working in a clean room or the like.

BACKGROUND OF THE INVENTION

As an industrial robot working in a clean room, hitherto, an orthogonal robot has been used. By contrast, an articulated robot has not been used in a clean room.

FIG. 3 shows a sectional view of a conventional articulated robot. The conventional articulated robot shown in FIG. 3 has multiple opening parts 51 to 55. If, therefore, the conventional articulated robot is used in clean room work, when operating the manipulator, it is necessary to prevent the dust particles that deposit in the arms from flowing outside from the opening parts or gaps in the arms. Moreover, due to the slide action between parts of one axis and the other axis of the articulated robot, volatile oil mist and fine particles may be released from the lubricant in the bearing and speed reducer located in the vicinity. Hence, countermeasures to collect or prevent the escape of these elements are also necessary.

In the conventional articulated robot, for use in work in a clean room, it is necessary to build up an enclosed structure by adding parts so as not to release dust outside. The enclosed structure requires significant design changes. In addition, the entire articulated robot is increased in size around the arms due to parts added by design changes, and also substantially increased in weight and cost.

SUMMARY OF THE INVENTION

The invention is intended to solve such problems, and it is hence an object to present an articulated robot capable of preventing release of dust in a simple constitution.

To achieve the object, the articulated robot of the invention comprises plural arms, a drive source for driving the arms, a closing cover accommodating the drive source inside to isolate it from the outside, communicating passages having a space for communicating with the arms and closing cover, and at least two opening parts opened to the outside.

A first aspect of the invention, relating to the articulated robot having the above constitution, is an articulated robot having a suction mechanism for sucking air from inside of the robot provided at one of the opening parts.

A second aspect of the invention is an articulated robot having a blowing mechanism for blowing air into the robot provided at one of the opening parts. Thus, the robot includes one type of air flow generator for creating an air flow through the robot, and the air flow generator can be either a suction mechanism or a blowing mechanism.

DETAILED DESCRIPTION OF THE EXEMPLARY EMBODIMENTS

Figure 1:
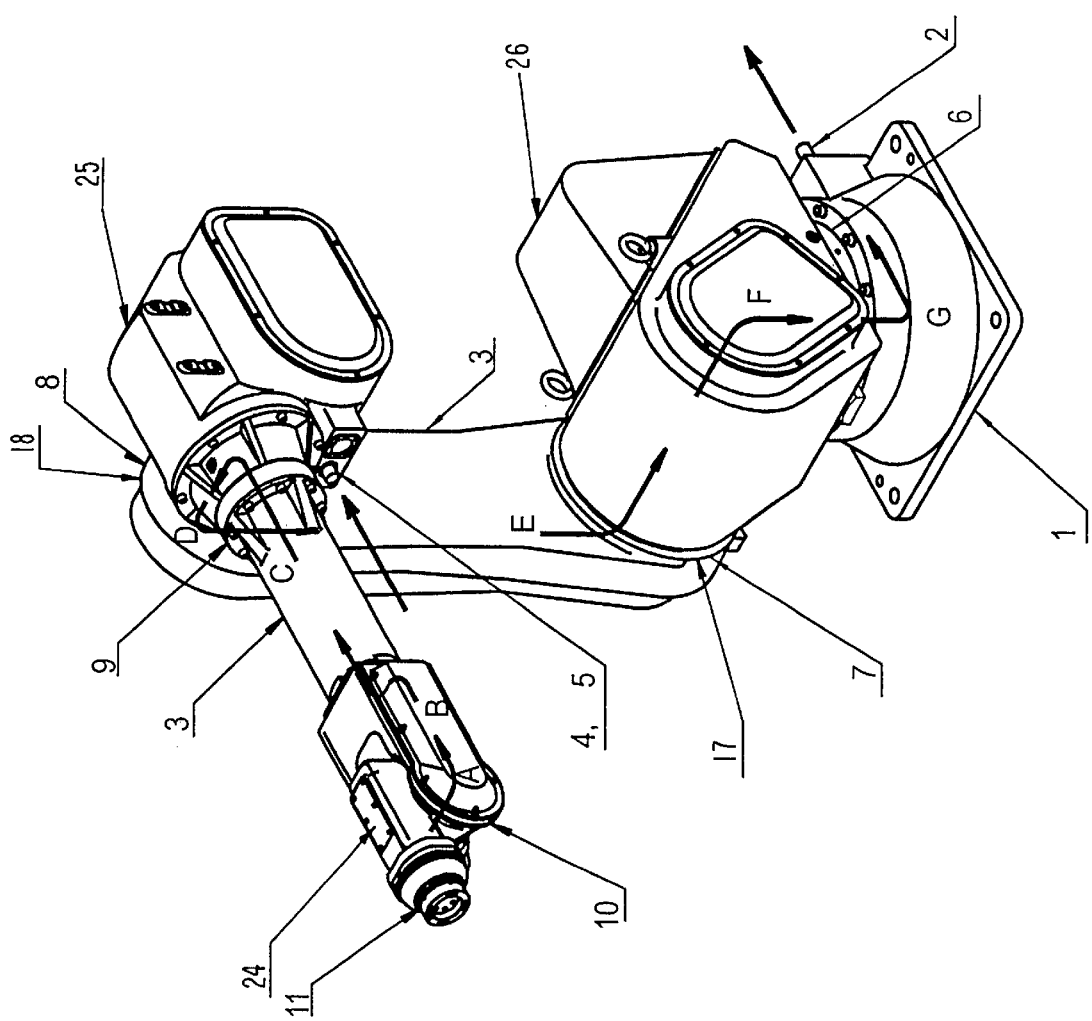
FIG. 1 is an outline drawing of an articulated robot in an embodiment of the invention.

Referring now to the drawings, embodiments of the invention are described below.

Embodiment 1

An articulated robot mainly comprises a base unit of a robot body, an arm unit having joints, and a wrist unit. The base unit, joints, and wrist unit incorporate individual drive sources for driving their parts.

Figure 2:
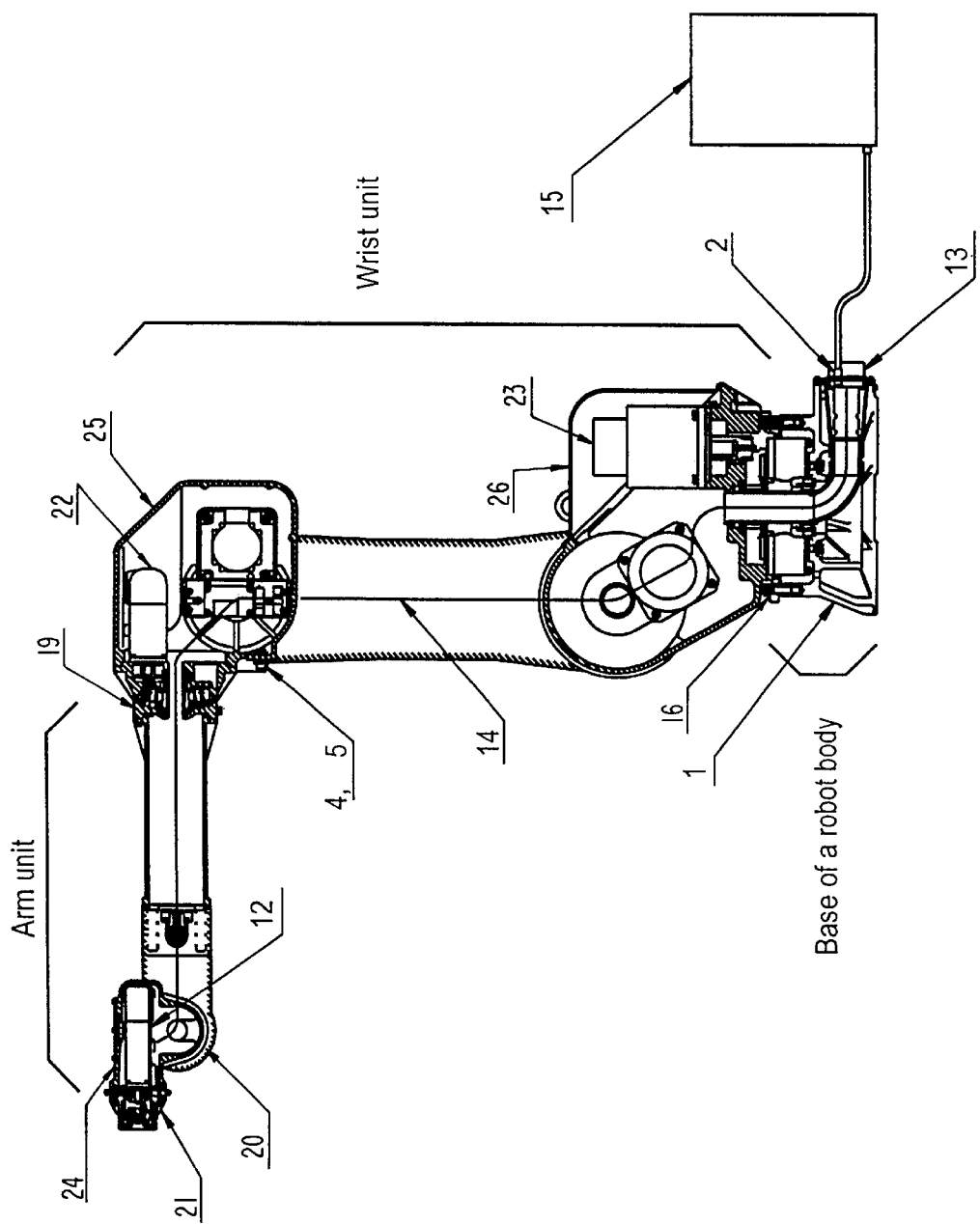
FIG. 2 is a sectional view of an articulated robot in an embodiment of the invention.
Figure 3:
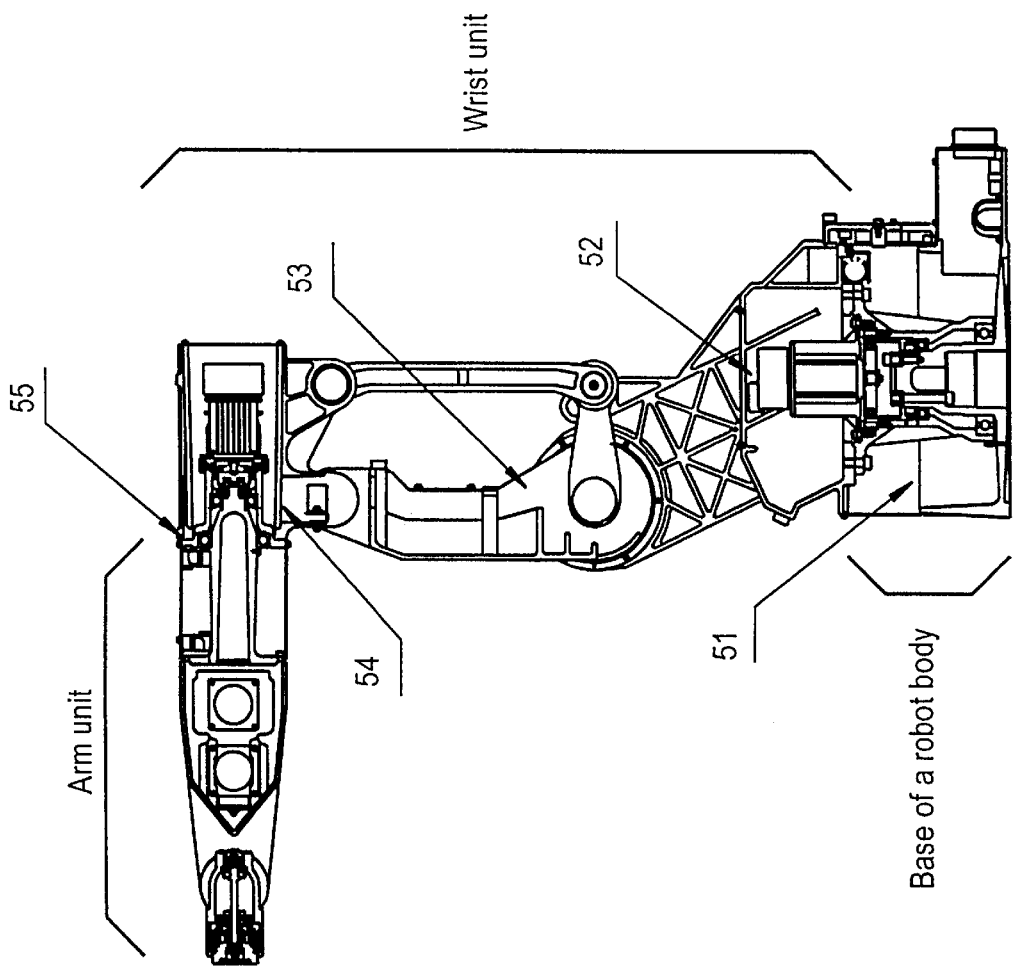
FIG. 3 is a sectional view of a conventional articulated robot.

FIG. 1 is an outline drawing of an articulated robot in embodiment 1 of the invention. A first opening 2 (i.e., suction port) is provided in the rear section of the base 1 of the robot body. A second opening 4 is provided at an intermediate position of a plurality of arms 3, and a filter 5 is provided in the opening 4. FIG. 2 is a sectional view of the articulated robot in the embodiment of the invention, in which the wrist unit (a first arm), arm unit (a second arm) and base form a hollow structure as indicated by hatching. As shown in FIG. 1, each arm 3 includes at least one slide part 6–11 which includes components that move, such as by rotation, relative to each other. In slide parts 6–11 in the hollow structure, seal packings 16–21 are placed in the slide parts to compose an enclosed structure. A signal wire 14 connected from a motor 12 (drive source) at the leading end of the arm unit to a motor (drive source) 22, 23 of each rotary shaft up to a signal connection connector 13 is placed in the hollow arm. Each drive source for driving joints and others is covered with a closing cover 24–26. The space enclosed by the hollow part of each arm and closing cover composes a communicating passage (not shown) mutually so that the pressure may be nearly equal. Thus, the hollow part in the arm is both the harness passing route and the air flow passage in the closing space. Accordingly, by sucking the air in the arm by using an air flow generator such as a suction pump 15 connected to the opening 2 provided in the rear section of the base 1, air flow passages A to G are maintained up to the intermediate second opening 4 (shown in FIG. 1).

Because the air is sucked at a constant flow rate by using the suction pump 15, this air flow passage remains at a constant air flow rate from the second opening 4 (inlet port) toward the first opening 2 (suction port) of the base. At this time, due to the passage resistance of the filter 5 provided in the second opening 4, the pressure in the arm becomes a negative pressure as compared with the atmosphere. This negative pressure is generated uniformly in the closing space, and always produces a vacuum for creating a suction into the arm from any slight gap existing in the slide parts and the arm recessed parts. Dust particles generated in the arms or slide parts are thus discharged outside of the clean room from the opening 2 through the suction pump 15. As a result, dust particles generated in the arms or slide parts do not flow out of the robot body (that is, into the clean room), so that the clean room is always kept dust-free.

In the articulated robot of embodiment 1, in order to realize an enclosed structure easily from the development stage of the robot, the arms and the closing cover are designed as a hollow structure except for the portions connecting with other structures, and seal packings can be placed in the slide parts of each axis in the articulated robot. Thus, by the arms, closing cover and slide parts, the robot isolated from the outside can be easily constructed.

In fabrication of the arm and closing cover, another opening part may also be needed, except for the portion connecting with the other structure. In such a case, the opening part is closed by using a cover or seal material of metal or resin.

In addition, to control the pressure in the closing space, the first opening is provided for sucking air inside the robot arm from the rear section of the base of the robot main body, so that the air may always be sucked easily.

In the absence of the second opening, however, the negative pressure level in the arm for sucking the air continuously in the enclosed structure elevates excessively, and the air may directly pass through the bearing or gear part of the speed reducer provided near the slide parts. If fresh air directly passes through the bearing or speed reducer, loss of lubricant or oxidation of lubricant in the parts required to be lubricated may be promoted, and adverse effects may be considered, such as lowering of lubricating performance and wear due to dust particles contained in the fresh air.

To avoid such adverse effects, in the invention, the first opening (suction port) for sucking the inside air is provided in the base, and the second opening (inlet port) having the filter is provided in the intermediate part of the arm or near the wrist unit. From this second opening, fresh air is passed in through the filter so that the pressure in the closing space may not reach an extremely negative pressure as compared with the atmosphere. In this constitution, by sucking air at a constant flow rate from the opening part of the base, a nearly identical rate of air flows in from the second opening part of the arm. At this time, the air flow can be controlled by the passage resistance of the filter so that a slight constant negative pressure may be maintained as compared with the atmosphere (i.e., the filter is adjustable to control the air flow through the filter and the passage).

This slight negative pressure as compared with the atmosphere allows the dust particles in the arm to be discharged out of the clean room through the suction pump from the first opening in the base without flowing out of the robot.

By varying the sectional area of the pipe passage of this second opening, the passage resistance is changed, so that the level of negative pressure can be easily controlled. Without causing any adverse effect on the bearing or speed reducer in the slide parts of the robot main body, the cleanliness of the articulated robot is remarkably enhanced.

In the invention, therefore, the hollow structure and closing space of such constitution can be realized, and it is not required to install a new air flow passage, so that the cost increase may be suppressed.

Also according to the invention, since the pressure level in the arm can be controlled by making use of the air flow passage, when a negative pressure is set in the arm, an articulated robot which creates an extremely low level of dust discharge is realized.

By optimizing the negative pressure level in the arm, without causing any adverse effect on the important parts of the articulated robot such as the speed reducer and bearing, the cleanliness of the articulated robot is realized.

The embodiment is explained with respect to the industrial robot working in a clean room, but it may also be applied as working robots in other applications, such as food processing and medical care industries where clean working environments are required.

Embodiment 2

In other applications, in the case of a robot working in very dusty and dirty environments, the following arrangement is possible. Such case is explained as embodiment 2 below.

Instead of the suction pump 15 shown in FIG. 2, the air flow generator may be a blower, and air is blown in from the first opening 2 (inlet port) of the base 1 of the robot main body by the blower. The air is then discharged from the second opening 4 (discharge port) by making use of the passage passing through the closing space in the arm, and the pressure inside the robot is set higher than the atmosphere. As a result, invasion of dust particles from the environments of installation of the robot into the inner parts of the robot such as the speed reducer and bearing can be prevented. Because invasion of dust is prevented, shortening of service life of the articulated robot due to dust can be prevented.

In addition, to control the pressure in the closing space, the first opening is provided for blowing out inside air from the rear section of the base of the robot main body, so that the air may always be blown out easily.

In the absence of the second opening, however, the pressure in the arm for blowing out the air continuously in the enclosed structure elevates excessively, and the air may directly pass through the bearing or gear part of the speed reducer provided near the slide parts. If fresh air directly passes through the bearing or speed reducer, loss of lubricant or oxidation of lubricant in the parts required to be lubricated may be promoted, and adverse effects may be considered such as lowering of lubricating performance and wear due to dust particles contained in the fresh air.

To avoid such adverse effects, in the invention, the first opening for blowing out the inside air is provided in the base, and the second opening having the filter is provided in the intermediate part of the arm or near the wrist unit. From this second opening, air is passed out through the filter so that the pressure in the closing space may not be an extreme pressure as compared with the atmosphere. In this constitution, by blowing in air at a constant flow rate through the first opening in the base, a nearly identical rate of air flows out through the second opening of the arm. At this time, the air flow can be controlled by the passage resistance of the filter so that a slight constant pressurized state may be maintained as compared with the atmosphere.

This slight pressurized state as compared with the atmosphere prevents external dust particles from flowing into the robot. Moreover, the cleanliness in the robot may be further enhanced by installing the dust filter at the suction port or exhaust port of the blower.

By varying the sectional area of the pipe passage of this second opening, the passage resistance is changed, so that the level of pressurized state can be controlled easily. Without causing any adverse effect on the bearing or speed reducer in the slide parts of the robot main body, the cleanliness of the articulated robot is remarkably enhanced.

The constitution of embodiment 2 is suited to the robot working in very dusty and inferior environments contrary to the application of embodiment 1.

As clear from the description herein, the invention is characterized by a hollow structure m the constitution of the articulated robot and one enclosed structure in the entire body of the arm and closing cover, so that the air flow passage can be maintained. Therefore, the articulated robot working in a clean room or poor environments can be presented.

What is claimed is:

1. An articulated robot comprising:

a base having a first opening;

a plurality of arms, at least one of said arms having a second opening, each of said arms having a sliding part sealed with packing;

a filter in said second opening, said filter being adjustable so as to control an air flow through said filter;

a drive source for driving said plurality of arms;

a closing cover covering said drive source, wherein said closing cover, said plurality of arms, and said base are connected such that a continuous communication passage is formed therein between said first opening and said second opening; and an air flow generating device for generating an air flow through said communication passage, said air flow generating device being located at said first opening.

2. The robot of claim 1, wherein said air flow generating device comprises a suction mechanism for sucking air through said communication passage and out of said first opening.

3. The robot of claim 2, wherein said second opening comprises an inlet port exclusively for allowing air to enter said communication passage, and wherein said first opening comprises a suction port exclusively for allowing air to exit said communication passage.

4. The robot of claim 1, wherein said air flow generating device comprises a blower mechanism for blowing air through said communication passage and into said first opening.

5. The robot of claim 4, wherein said second opening comprises a discharge port exclusively for allowing air to exit said communication passage, and wherein said first opening comprises an inlet port exclusively for allowing air to enter said communication passage.

6. The robot of claim 4, wherein said filter comprises a first filter and said blower has an inlet port and an exhaust port, further comprising a second filter for filtering dust, said second filter being located at one of said inlet port and said exhaust port of said blower.

7. The robot of claim 1, wherein said second opening comprises a port exclusively for allowing air to pass therethrough, and wherein said first opening comprises a port exclusively for allowing air to pass therethrough.

* * * * *